(12) United States Patent
Wang

(10) Patent No.: US 7,926,781 B2
(45) Date of Patent: Apr. 19, 2011

(54) ELECTRONIC DEVICE WITH SUPPORT LEG

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 105 days.

(21) Appl. No.: 12/342,295

(22) Filed: Dec. 23, 2008

(65) Prior Publication Data

US 2010/0127137 A1    May 27, 2010

(30) Foreign Application Priority Data

Nov. 25, 2008  (CN) .......................... 2008 1 0305721

(51) Int. Cl.
*A47G 29/00* (2006.01)

(52) U.S. Cl. .... 248/685; 248/688; 248/351; 361/679.55

(58) Field of Classification Search .................. 248/351, 248/677, 688, 686, 685; 361/679.59, 679.55
See application file for complete search history.

(56) References Cited

U.S. PATENT DOCUMENTS

| | | | | |
|---|---|---|---|---|
| 5,239,444 A * | 8/1993 | Sasaki | 361/679.12 |
| 5,251,102 A * | 10/1993 | Kimble | 361/679.09 |
| 5,297,003 A * | 3/1994 | Nomura et al. | 361/679.12 |
| 5,469,327 A * | 11/1995 | Cheng | 361/679.55 |
| 5,754,395 A * | 5/1998 | Hsu et al. | 361/679.11 |
| 5,828,552 A * | 10/1998 | Ma | 361/704 |
| 6,053,589 A * | 4/2000 | Lin | 312/271 |
| 6,097,592 A * | 8/2000 | Seo et al. | 361/679.55 |
| 6,097,595 A * | 8/2000 | Cipolla | 361/679.21 |
| 6,098,952 A * | 8/2000 | Tonn | 248/688 |
| 6,930,881 B2 * | 8/2005 | Karidis et al. | 361/679.55 |
| 6,961,240 B2 * | 11/2005 | Janicek | 361/679.46 |
| 7,566,043 B2 * | 7/2009 | Chen | 248/616 |
| 7,679,905 B2 * | 3/2010 | Wu et al. | 361/679.59 |
| 2009/0147469 A1 * | 6/2009 | Chen et al. | 361/679.55 |
| 2010/0002379 A1 * | 1/2010 | Hadad et al. | 361/679.59 |
| 2010/0008039 A1 * | 1/2010 | Shen et al. | 361/679.55 |

* cited by examiner

*Primary Examiner* — Terrell McKinnon
*Assistant Examiner* — Bradley H Duckworth
(74) *Attorney, Agent, or Firm* — Clifford O. Chi

(57) ABSTRACT

An electronic device includes a main body, a cover, and two support legs. The main body defines two receiving portions. The cover is rotatably connected to the main body. Two resisting portions are formed on the cover. The support legs are rotatably received in the receiving portions of the main body respectively. When the cover rotates relative to the main body, the resisting portions resist the support legs to rotate, thus driving the support legs protruding out from the main body.

14 Claims, 9 Drawing Sheets

ELECTRONIC DEVICE WITH SUPPORT LEG

BACKGROUND

1. Field of the Disclosure

The present disclosure generally relates to electronic devices and, particularly, to an electronic device with a main body and a rotatable cover.

2. Discussion of the Related Art

Notebook computers have become popular alternatives to desktop computers because of their portability. A typical notebook computer includes a display body and a main body with a keyboard. The display body is rotatably attached to the main body so that the display body can be opened and closed relative to the main body. In most circumstances, the typical notebook computer is operated on a tabletop. However, the keyboard is usually parallel to the tabletop making it very uncomfortable for a user to operate the notebook. In addition, the main body of the notebook computer is in contact with the tabletop. Heat produced by internal electronic components cannot be dispersed efficiently from the main body of the notebook, even though the notebook has a fan for heat dissipation. As a result, the internal electronic components may be damaged from overheating. Accordingly, a notebook computer which can solve the above-described problems is needed.

One such notebook computer has a keyboard that pops up away from a main body of the notebook computer and slanted relative to the main body so that it may be comfortable for the user to operate the keyboard. In addition, a gap for emitting heat is formed between the keyboard and the main body.

However, dust and harmful substances can easily get inside the main body through the gap and deposit on the internal electronic components. This may cause a short circuit of the internal electronic components, and make it difficult to disperse the heat produced by the internal electronic components.

Therefore, an electronic device which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
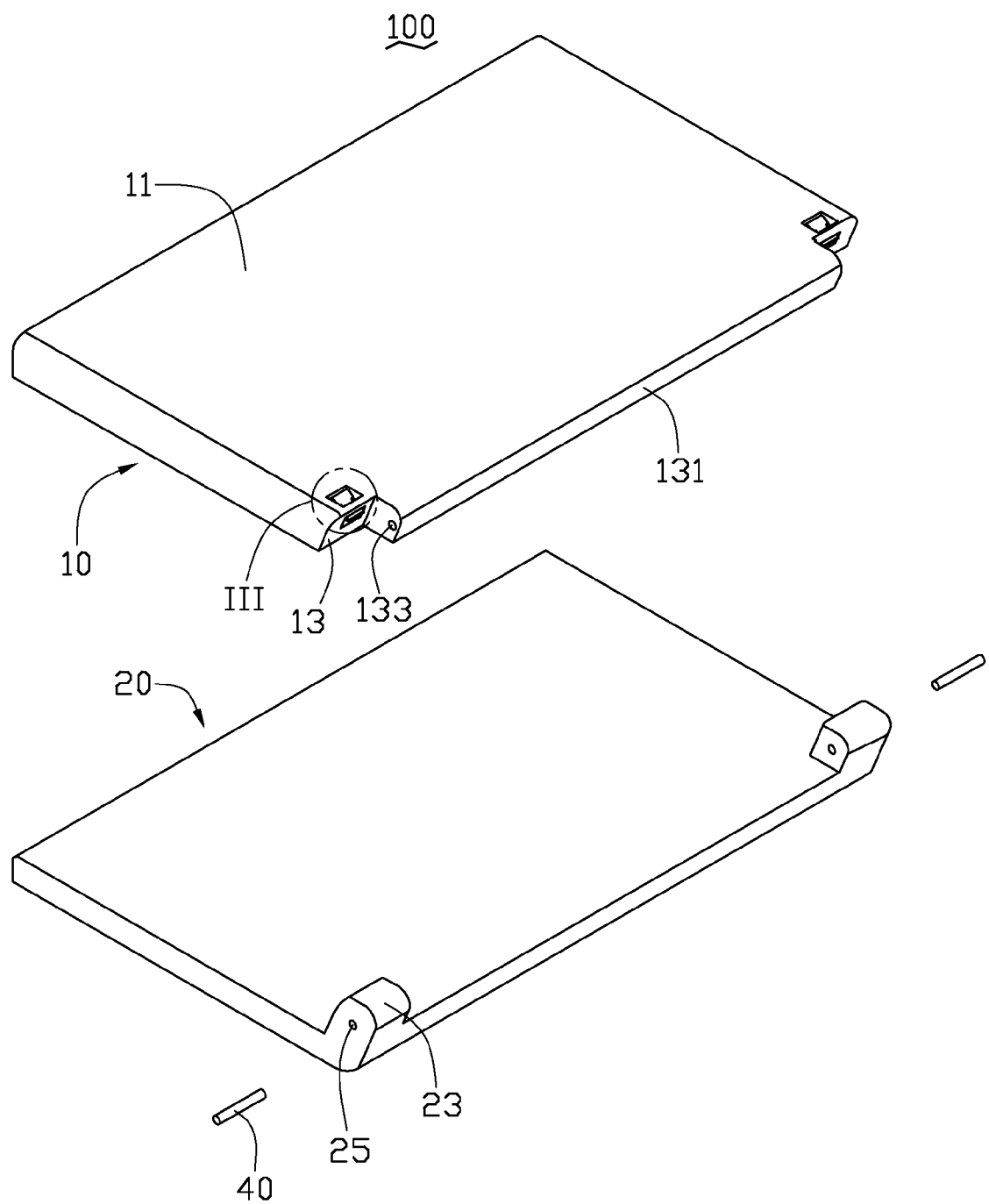
FIG. 1 is an exploded, isometric view of a first embodiment of an electronic device.
Figure 2:
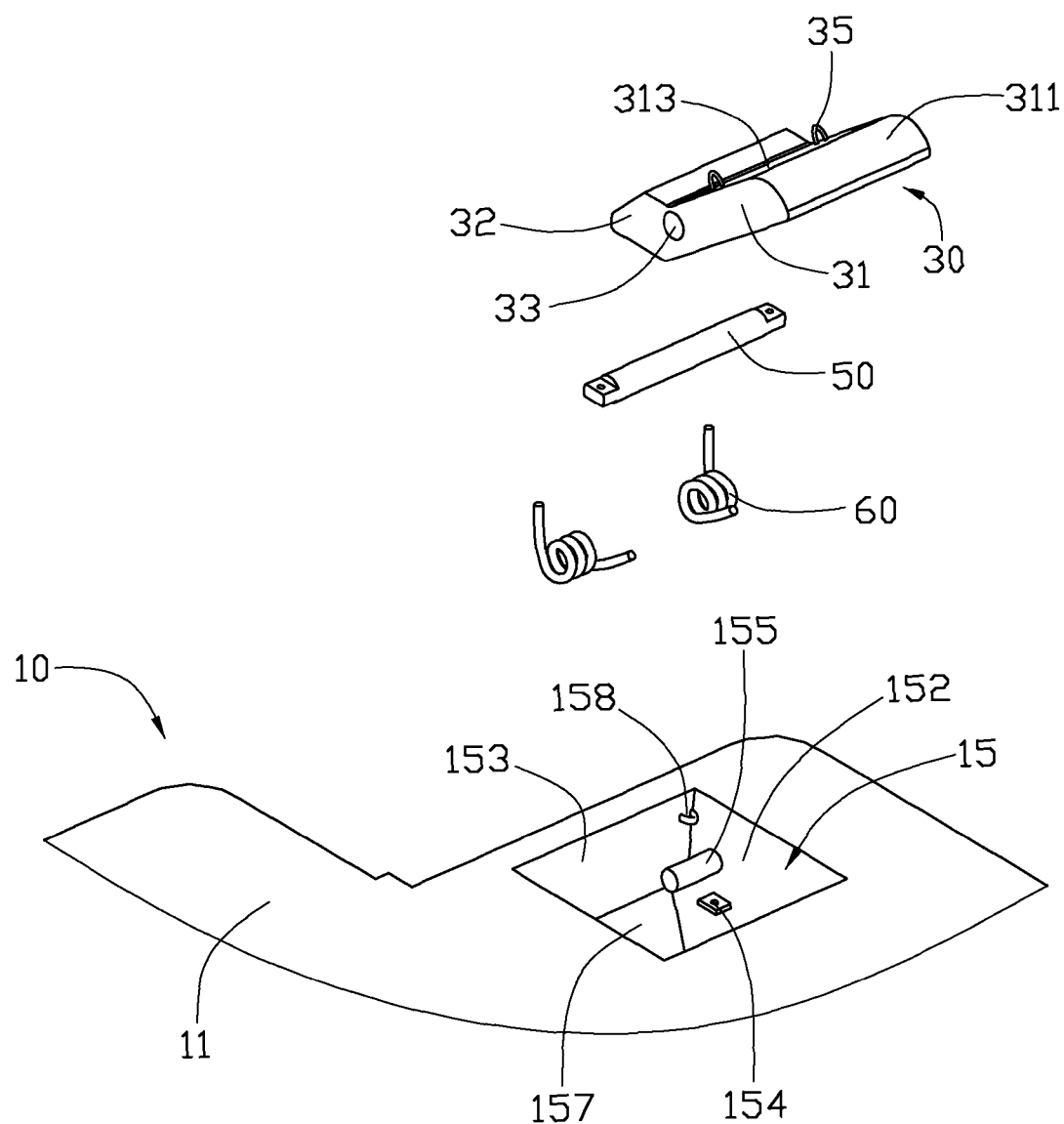
FIG. 2 is a partial, exploded, isometric view of the electronic device of FIG. 1.
Figure 3:
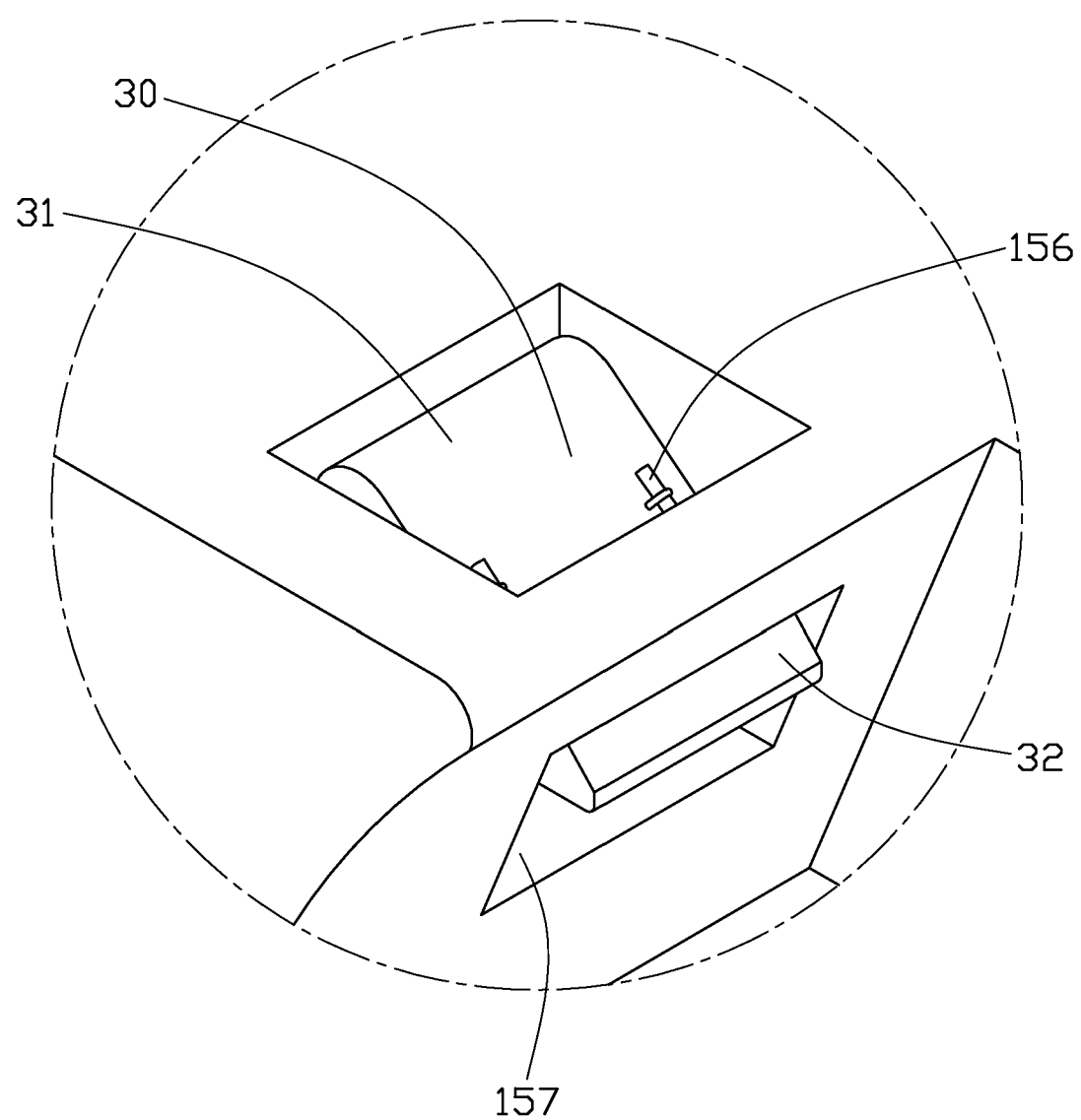
FIG. 3 is an enlarged view of a region III of the electronic device of FIG. 1

Referring to FIGS. 1 and 2, a first embodiment of an electronic device 100 includes a main body 10, a cover 20, two support legs 30, two pivot shafts 40, two connecting shafts 50, and a plurality of elastic members 60. The cover 20 is rotatably connected to the main body 10 via the pivot shafts 40. Each support leg 30 is rotatably connected to the main body 10 via one corresponding connecting shaft 50. In the illustrated embodiment, the electronic device 100 is a notebook computer.

The main body 10 includes a bottom surface 11 and a side surface 13 adjacent to the bottom surface 11. The bottom surface 11 defines two receiving portions 15 adjacent to the side surface 13. Each receiving portion 15 includes two first sidewalls 152 and a second sidewall 153 connecting the first sidewalls 152. A fixing piece 154 and a positioning pole 155 are formed on each first sidewall 152. The elastic members 60 are sleeved on the positioning poles 155. The second sidewall 153 defines a cutout 157 in a first end. Two first positioning hooks 158 are formed on the second end of the second sidewall 153 opposite to the first end. Each first positioning hook 158 receives an end of the elastic member 60. In the illustrated embodiment, the receiving portion 15 is a groove. The main body 10 may be substantially rectangular shaped, and the elastic member 60 may be a torsion spring. An assembling portion 131 extends from the side surface 13 of the main body 10. The assembling portion 131 defines two assembling holes 133 on opposite ends to receive the pivot shafts 40.

The cover 20 defines two resisting portions 23 in a side thereof. Each resisting portion 23 defines a positioning hole 25 to receive a corresponding pivot shaft 40. In the illustrated embodiment, the cover 20 is substantially rectangular shaped.

Each support leg 30 includes a support portion 31 and a contacting portion 32 obliquely extending from an end of the support portion 31. The support portion 31 includes a support surface 311. The support portion 31 defines a pivot hole 33 to receive the connecting shaft 50. Two second positioning hooks 35 are formed on a side surface 313 of the support portion 31. Each second positioning hook 35 is configured to receive an end of a corresponding elastic member 60.

Referring to FIGS. 1 through 4, when assembling one of the support legs 30 to the receiving portion 15 of the main body 10, the connecting shaft 50 extends through the pivot hole 33 of one corresponding support leg 30. One end of the connecting shaft 50 is fixed to the fixing piece 154 of one corresponding first sidewall 152, and the other end of the connecting shaft 50 is fixed to the fixing piece 154 of the other first sidewall 152. One end of the elastic member 60 engages with one first positioning hook 158 of the second sidewall 153, and the other end of the elastic member 60 engages with one second positioning hook 35 of the support leg 30. The other support leg 30 is assembled to another receiving portion 15 of the main body 10, according to the above-described assembling steps. Each support leg 30 is received in the receiving portion 15, and a gap is defined between the support surface 311 of each support leg 30 and the bottom surface 11 of the main body 10. Each elastic member 60 resists against the support leg 30 and the main body 10. The contacting portion 32 of each support leg 30 extends through the cutout 157 of the second sidewall 153. Each pivot shaft 40 extends through one corresponding resisting portion 23, and engages in the assembling hole 133 of the assembling portion 131, thus rotatably connecting the cover 20 to the main body 10.

Figure 4:
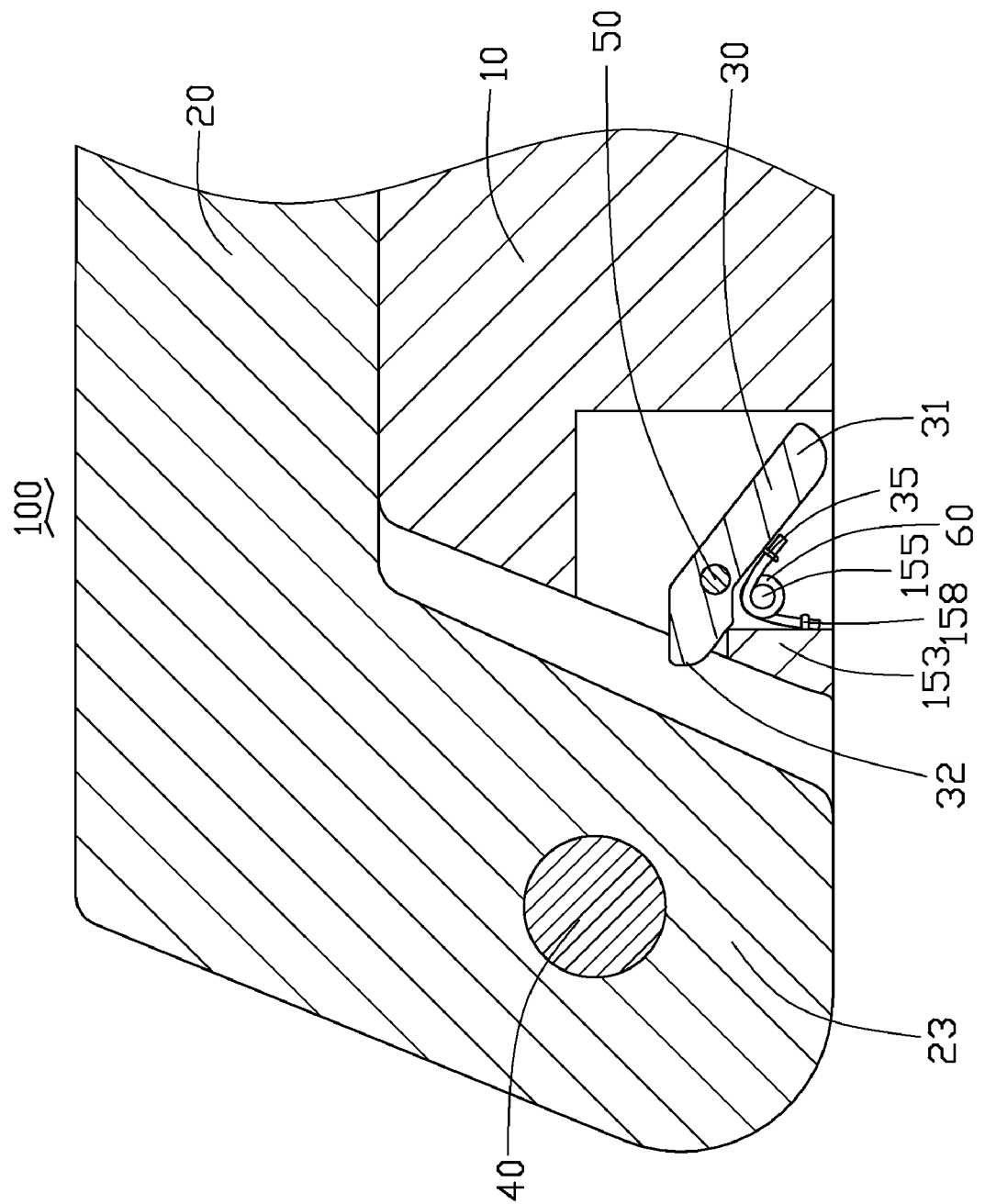
FIG. 4 is a partial, cross-sectional view of the electronic device of FIG. 1, shown in a closed state.
Figure 5:
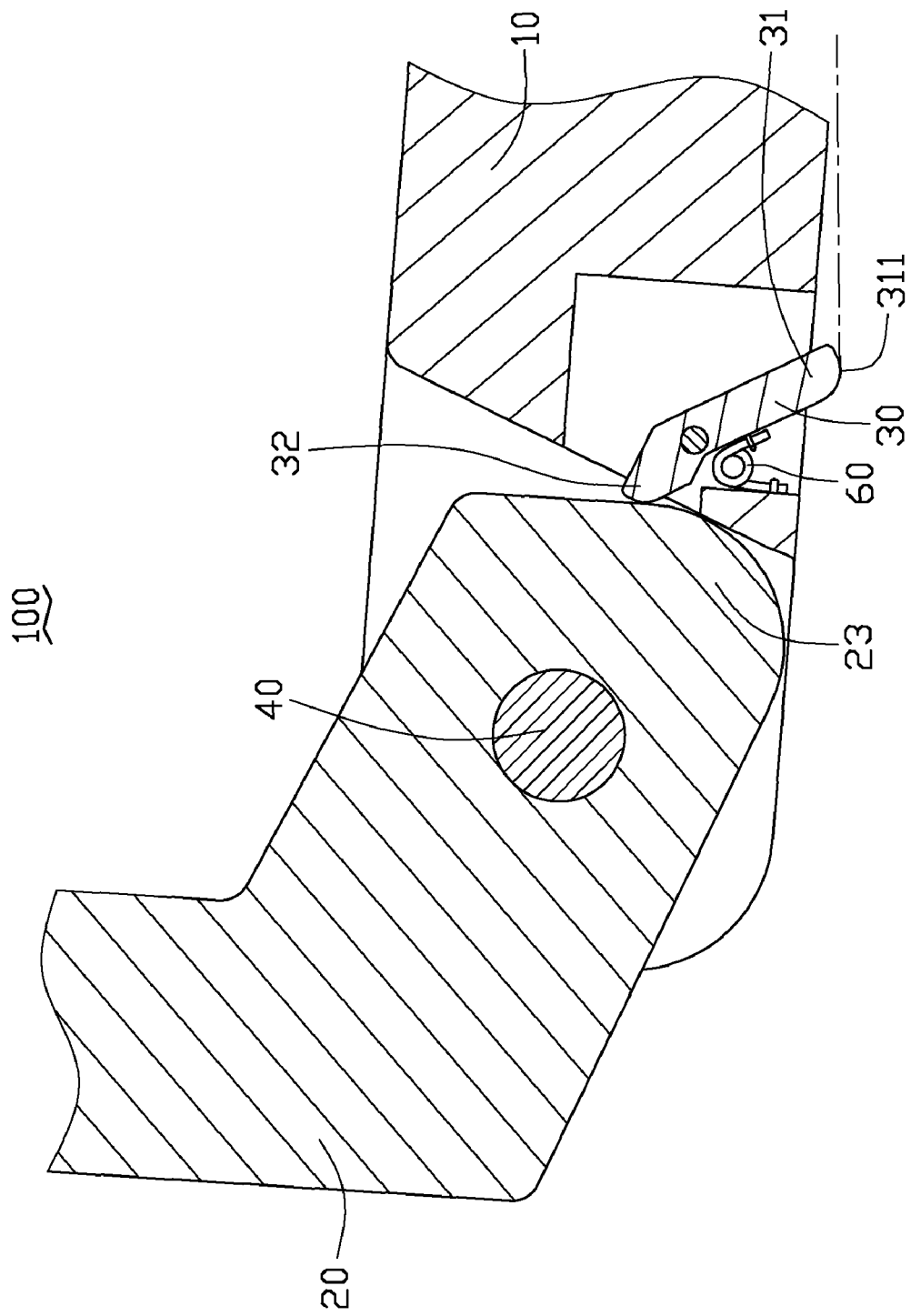
FIG. 5 is similar to FIG. 4, but shown in an opened state.

Referring to FIGS. 4 and 5, when the electronic device 100 is in a closed state, the cover 20 is attached to the main body 10, each support leg 30 is received in the receiving portion 15, and a gap is defined between the support surface 311 of each support leg 30 and the bottom surface 11 of the main body 10. In other words, the main body 600 is not supported by the support legs 33. When opening the electronic device 100, the resisting portions 23 resist the contacting portions 32 of the support legs 30. The support legs 30 are driven to rotate about the connecting shafts 50, and the elastic members 60 are compressed. After the support legs 30 rotate through a predetermined angle on the connecting shaft 50, the support legs 30 protrude out of the bottom surface 11 of the main body 10. As a result, the main body 10 of the electronic device 100 is lifted and supported at an inclined angle by the support members 30. In the illustrated embodiment, a spacious gap with a height of about 2 centimeters is formed between the bottom surface 11 of the main body 10 and a tabletop.

In an opened state, the electronic device 100 is inclined at an angle such that the lifted side of the electronic device 100 is above a supporting area such as the tabletop. Therefore, operating a keyboard of the electronic device 100 would be comfortable. In addition, heat can be quickly dispersed from the bottom surface 11 through the spacious gap defined between the main body 100 and the supporting area. Accordingly, the heat emitted or generated by the electronic components can be dispersed more efficiently. Since the support legs 30 protrude out of the bottom surface 11 of the main body 10 by opening the cover 20, the electronic device 100 is convenient for use.

It may be appreciated that the electronic device 100 may include only one support leg 30. In this case, the support leg 30 may be positioned on a middle portion of one side of the main body 10. The electronic device 100 may also include three or more support legs 30. The receiving portion 15 and the support legs 30 can also be applied in other types of electronic devices, such as a personal digital assistant (PDA).

Figure 6:
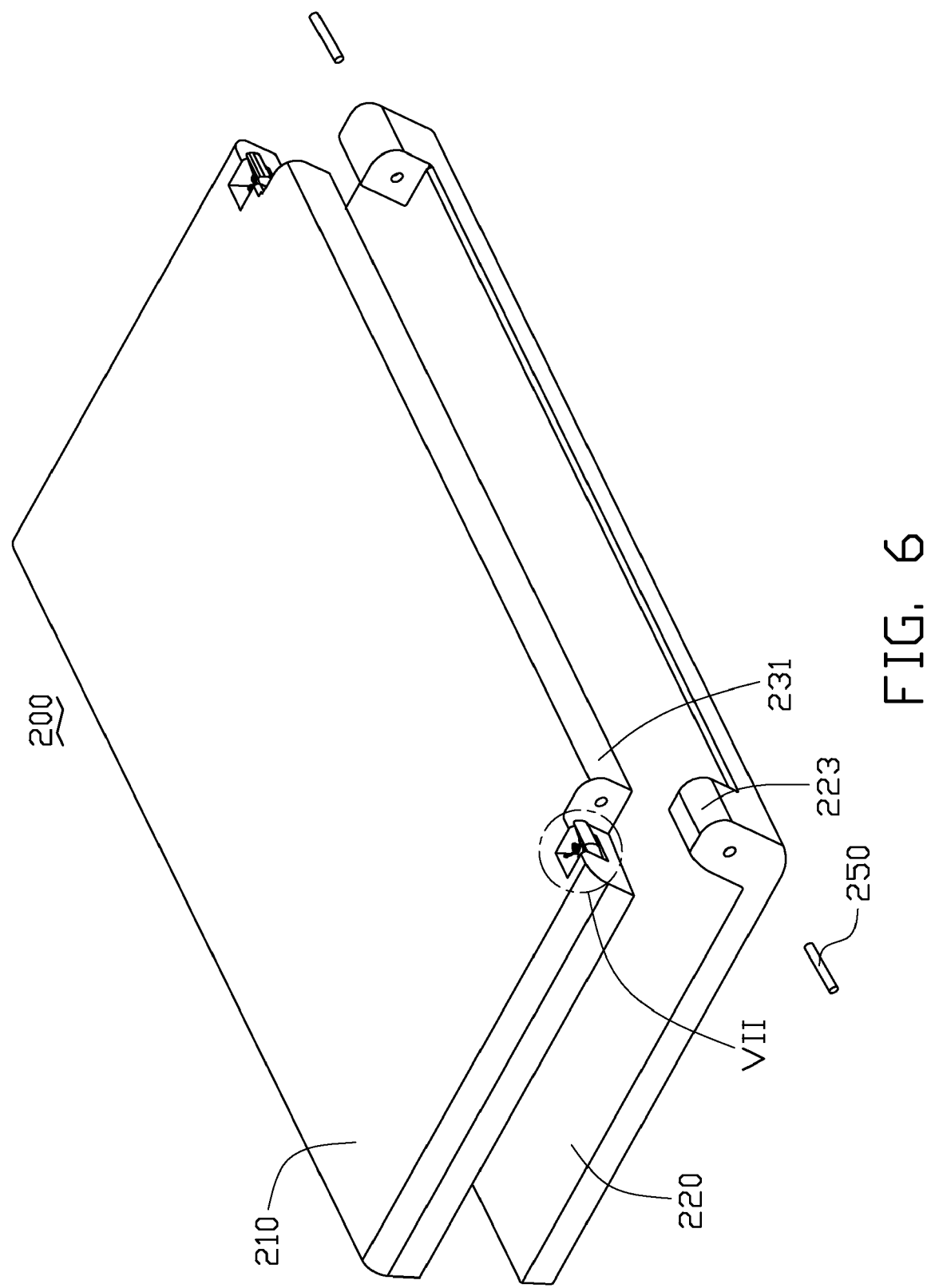
FIG. 6 is an exploded, isometric view of a second embodiment of an electronic device.
Figure 7:
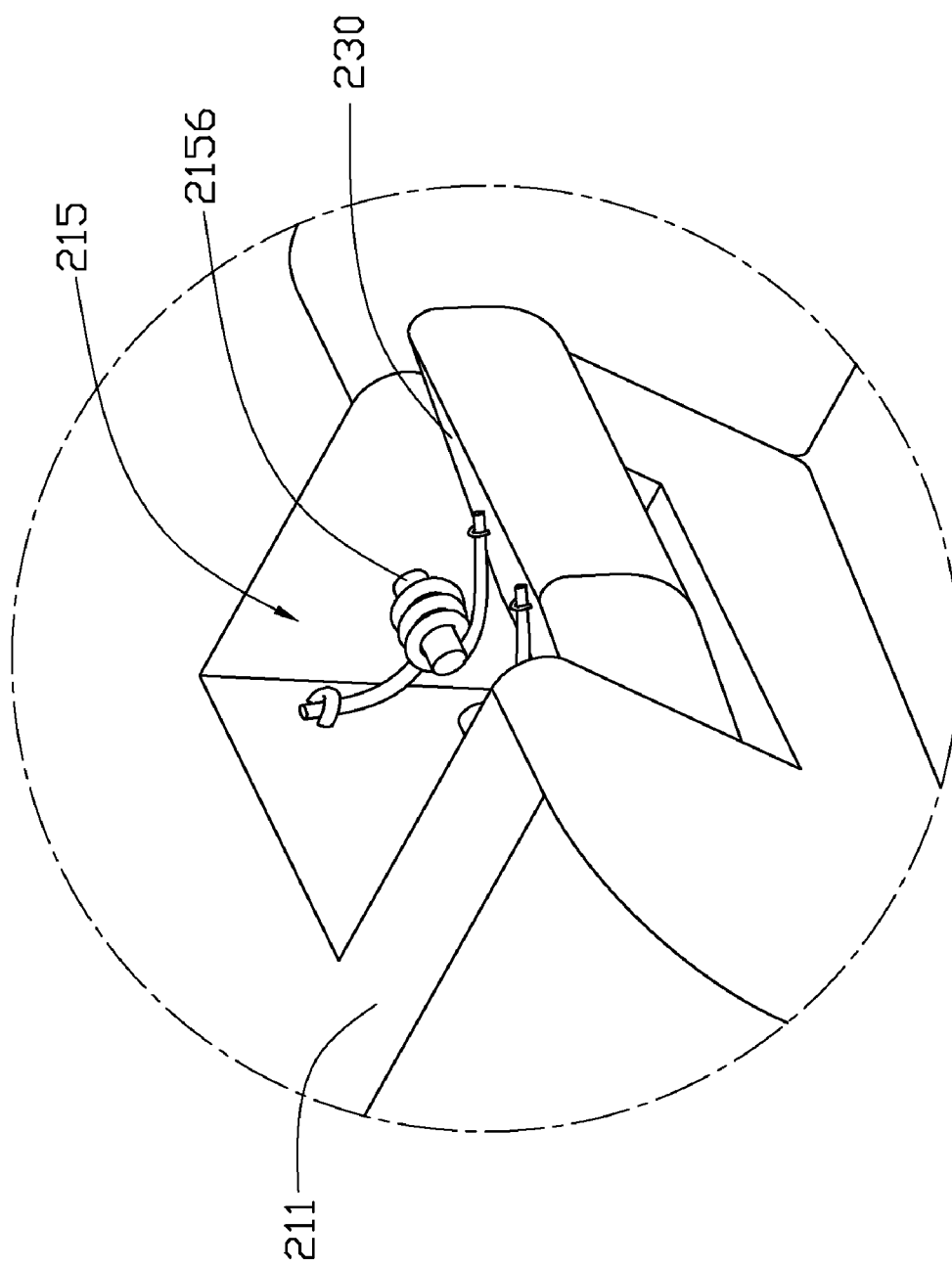
FIG. 7 is an enlarged view of a region VII of the electronic device of FIG. 6
Figure 8:
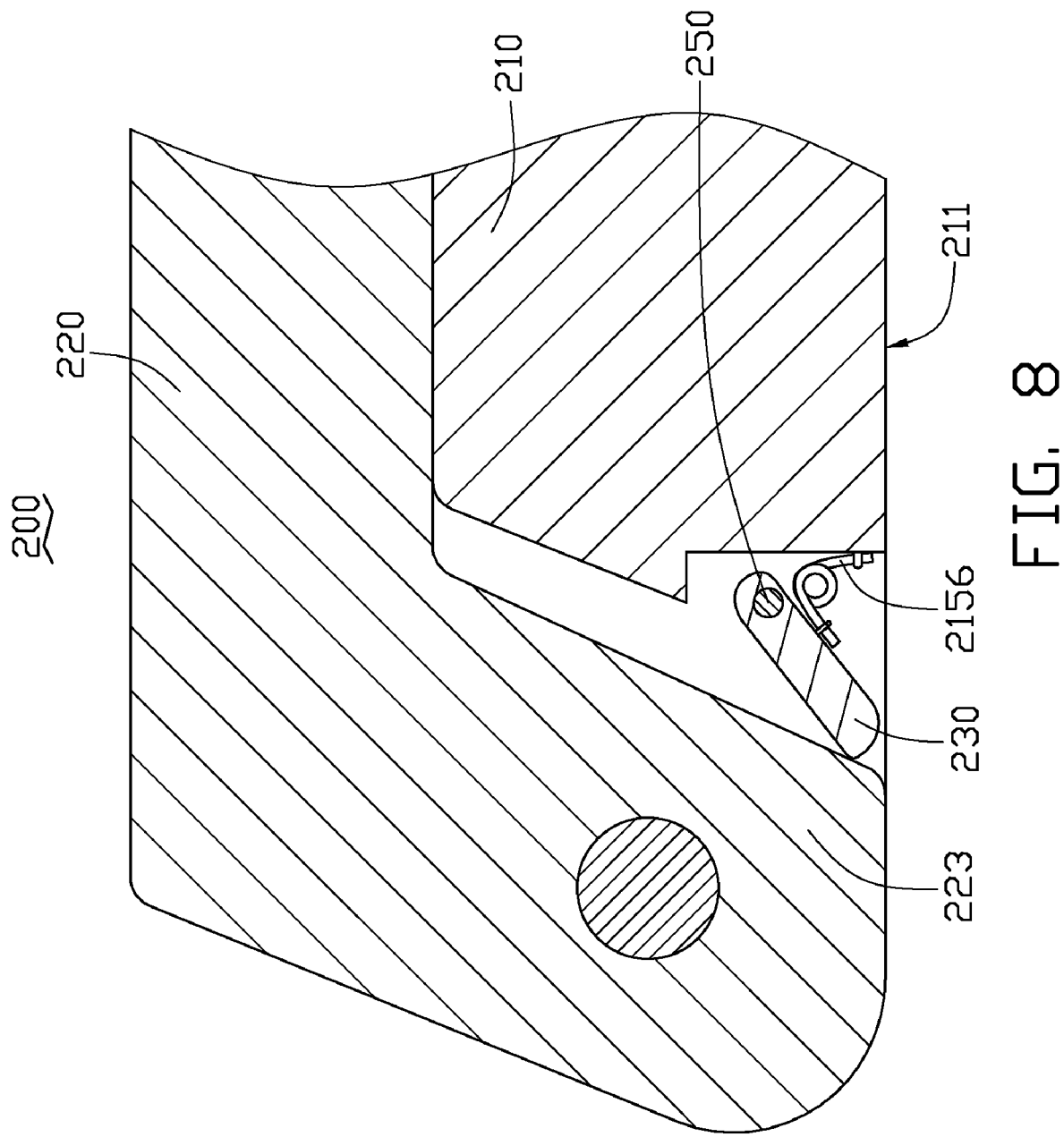
FIG. 8 is a partial cross-sectional view of the electronic device of FIG. 6, shown in a closed state.
Figure 9:
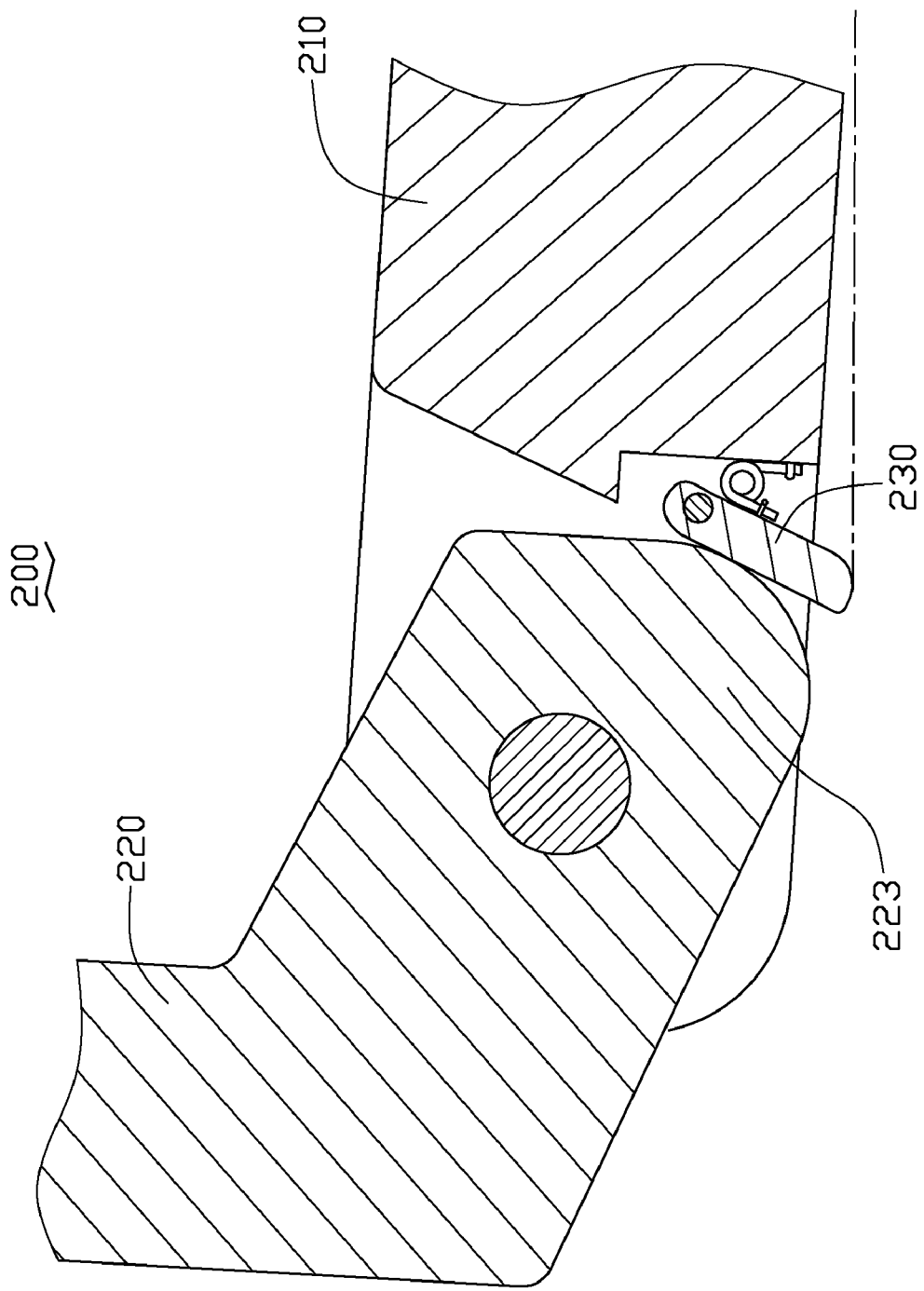
FIG. 9 is similar to FIG. 8, but shown in an opened state.

Referring to FIGS. 6 and 9, a second embodiment of an electronic device 200 is similar to the first embodiment of the electronic device 100, except that two support legs 230 is substantially rectangular shaped. The electronic device 200 includes a main body 210 and a cover 220. The cover 20 is rotatably connected to the main body 10 via the pivot shafts 250. A cross-section of two receiving portions 215 taken along a plane perpendicular to an extending direction of the assembling portion 231 is substantially triangular. The support leg 230 is received in the receiving portion 215. An end of the support leg 230 is sleeved on a pivot shaft 250, the other end of the support leg 230 resists the cover 220. In opening the notebook computer 200, the resisting portions 223 of the cover 220 resist the support legs 230. The support legs 230 are driven to rotate on a connecting shaft 250, and an elastic member 2156 is compressed. After the support legs 230 rotates on the connecting shaft 250 through a predetermined angle, the support legs 230 protrude out from the main body 210. As a result, the main body 210 of the electronic device 200 is lifted and supported at an inclined angle by the support members 230. In the illustrated embodiment, a spacious gap with a height of about 2 centimeters is formed between a bottom surface 211 of the main body 210 and a supporting area.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
    a main body defining at least one receiving portion, the at least one receiving portion comprising two opposite first sidewalls;
    at least one connecting shaft connected to the first sidewalls;
    a cover rotatably connected to the main body, wherein at least one resisting portion is formed on the cover;
    at least one support leg rotatably received in the at least one receiving portion of the main body via the at least one connecting shaft;
    a positioning pole formed on the main body; and
    an elastic member sleeved on the positioning pole and compressed between the support leg and the main body;
    wherein when the cover rotates relative to the main body, the at least one resisting portion causes the at least one support leg to rotate and protrude out from the main body.

2. The electronic device of claim 1, wherein a fixing piece is formed on each first sidewall; the at least one connecting shaft is fixedly connected to the fixing piece.

3. The electronic device of claim 2, wherein the positioning pole is formed on the first sidewall.

4. The electronic device of claim 3, wherein the elastic member is a torsion spring.

5. The electronic device of claim 4, wherein the at least one receiving portion further comprises a second sidewall connecting with the first sidewalls, a first positioning hook is formed on the second sidewall; a second positioning hook is formed on the at least one support leg; one end of the elastic member engages with the first positioning hook, the other end of the elastic member engages with the second positioning hook.

6. The electronic device of claim 1, wherein the at least one support leg comprises two support legs; the at least one resisting portion comprises two resisting portions; when the cover rotates relative to the main body, the resisting portions resist the support legs respectively.

7. The electronic device of claim 6, wherein the at least one receiving portion comprises two receiving portions; the support legs are received in the receiving portions respectively.

8. The electronic device of claim 1, wherein the at least one support leg comprises a support portion and a contacting portion aslant extending from an end of the support portion.

9. The electronic device of claim 1, further comprising at least one pivot shaft;
    the main body comprises an assembling portion; the at least one pivot shaft extends through the at least one resisting portion of the cover, and engages in the assembling portion, to rotatably connect the cover to the main body.

10. The electronic device of claim 1, wherein the electronic device is a notebook computer.

11. An electronic device, comprising:
    a main body defining at least one receiving portion, the at least one receiving portion comprising two opposite first sidewalls;
    at least one connecting shaft connected to the first sidewalls;
    a cover rotatably connected to the main body, wherein a resisting portion is formed on the cover;
    a support leg rotatably connected to the main body via the at least one connecting shaft, wherein the support leg is received in the main body;
    a positioning pole formed on the main body; and
    an elastic member sleeved on the positioning pole and compressed between the support leg and the main body;

wherein when the cover is rotated relative to the main body, the resisting portion causes the support leg to rotate, so that the main body is supported by the support leg.

12. The electronic device of claim 11, wherein the support leg comprises a support portion and a contacting portion slantingly extending from an end of the support portion.

13. The electronic device of claim 11, further comprising a pivot shaft; the main body comprises an assembling portion; the cover comprises a resisting portion; the pivot shaft extends through the resisting portion of the cover, and engages in the assembling portion, to rotatably connect the cover to the main body.

14. The electronic device of claim 11, wherein the electronic device is a notebook computer.

* * * * *